United States Patent
Brown

[11] Patent Number: 5,358,079
[45] Date of Patent: Oct. 25, 1994

[54] DISC BRAKE WITH FRICTION PAD BACKING PLATE BIASING SPRING

[75] Inventor: Glenn G. Brown, Niles, Mich.

[73] Assignee: AlliedSignal Inc., Morristown, N.J.

[21] Appl. No.: 124,741

[22] Filed: Sep. 21, 1993

[51] Int. Cl.⁵ .................................. F16D 65/02
[52] U.S. Cl. .................... 188/73.38; 188/73.36
[58] Field of Search ................ 188/72.4, 73.32, 73.33, 188/73.35, 73.36, 73.37, 73.38, 73.39, 205 A

[56] References Cited

U.S. PATENT DOCUMENTS

| | | | |
|---|---|---|---|
| 3,592,301 | 7/1971 | Auth | 188/73.6 |
| 3,605,956 | 9/1971 | Hahm et al. | 188/72.3 |
| 3,768,605 | 10/1973 | Carre | 188/73.5 |
| 3,783,980 | 1/1974 | Kallmeyer | 188/73.5 |
| 4,044,864 | 8/1977 | Karasudani | 188/73.3 |
| 4,049,087 | 9/1977 | Heinz et al. | 188/73.5 |
| 4,060,154 | 11/1977 | Smith | 188/73.3 |
| 4,245,723 | 1/1981 | Moriya | 188/72.3 |
| 4,267,904 | 5/1981 | Belart | 188/73.3 |
| 4,422,534 | 12/1983 | Oshima | 188/73.38 |
| 4,429,769 | 2/1984 | Oshima et al. | 188/73.31 |
| 4,441,588 | 4/1984 | Saito | 188/73.38 |
| 4,463,837 | 8/1984 | Courbot | 188/73.38 |
| 4,515,249 | 5/1985 | Escarabajal et al. | 188/73.38 |
| 4,527,667 | 7/1985 | Courbot | 188/73.34 |
| 4,538,708 | 9/1985 | Seki | 188/73.38 |
| 4,577,731 | 3/1986 | Burgdorf et al. | 188/73.33 |
| 4,669,583 | 6/1987 | Mery | 188/73.38 |
| 4,673,065 | 6/1987 | Gerard et al. | 188/73.38 |
| 4,690,254 | 9/1987 | Couvez | 188/73.36 |
| 4,699,254 | 10/1987 | Mery | 188/73.36 |
| 4,936,422 | 6/1990 | Mery et al. | 188/73.38 |
| 5,002,161 | 3/1991 | Pindat | 188/73.38 |
| 5,064,028 | 11/1991 | Antony et al. | 188/73.38 |
| 5,251,727 | 10/1993 | Loeffler et al. | 188/205 A |

FOREIGN PATENT DOCUMENTS

| | | |
|---|---|---|
| 1967110 | 10/1977 | Fed. Rep. of Germany . |
| 2745947 | 4/1978 | Fed. Rep. of Germany . |
| 2951673 | 5/1978 | Fed. Rep. of Germany . |
| 2854810 | 6/1979 | Fed. Rep. of Germany . |
| 50-98825 | 1/1975 | Japan . |

*Primary Examiner*—Robert J. Oberleitner
*Assistant Examiner*—Chris Schwartz
*Attorney, Agent, or Firm*—Larry J. Palguta; Leo H. McCormick, Jr.

[57] ABSTRACT

The disc brake (10) comprises a support member (12) having horizontal (11C) and vertical (11A) surfaces intersecting at chamfered corner surfaces (11B) forming torque receiving portions (11B). The caliper (20) of the disc brake (10) has a top central opening (13) comprising sloped side walls (15) intersecting with sloped top inner walls (17) of the caliper (20). Friction pad backing plates (26, 28) include circumferentially spaced apart lateral projections (21) each having a chamfered corner surface (2B) which engages the corresponding chamfered corner surface (11B) of the support member (12), and a radially outwardly extending extension (27) having a V-shaped groove (29) engaged by a unitary leaf pad spring (40). The unitary leaf pad spring (40) comprises a generally H-shaped spring (40) having a central body portion (41) forming a depending longitudinal rib (41) and a pair of opposite outwardly extending multiple bend change-of-direction arms (42) at each end of the central body portion (41), each arm (42) terminating in a radially outwardly extending finger terminal end (43). The terminal ends (43) of the spring (40) engage the sloped top inner walls (17) of the caliper (20) and the depending longitudinal rib (41) engages the grooves (29) of the extensions (27) to bias the chamfered corner surfaces (2B) of the lateral projections (21) into engagement with the torque receiving portions (11B) of the support member (12).

5 Claims, 3 Drawing Sheets

DISC BRAKE WITH FRICTION PAD BACKING PLATE BIASING SPRING

The present invention relates generally to a disc brake, and in particular no a disc brake having a spring biasing the friction pad backing plates into engagement with a support member.

Disc brakes utilize many types of springs in order to eliminate rattling noises associated therewith. The springs may be located at numerous locations within the disc brake, such as between the friction pad backing plates and the caliper as disclosed in U.S. Pat. No. 3,768,605 and U.S. Pat. No. 4,392,561. It is highly desirable that the spring maintain the friction pad backing plates in nonrattling engagement with the support member, while the spring remains able to move relative to the backing plates when relative movement occurs between the caliper and the backing plates. It is desirable that the spring be of a strong, robust design which is easily mounted within the disc brake, be subject to easy visual inspection, and be easily disassembled and reassembled during servicing of the disc brake.

The present invention provides solutions to the above by providing a disc brake, comprising a support member having torque receiving portions for engagement by first and second friction pad backing plates, a caliper mounted for axially slidable movement relative to the support member via pin means extending between the caliper and the support member, the first and second friction pad backing plates each having circumferentially spaced apart lateral projections shaped complementary to and engaging the torque receiving portions of said support member, each backing plate having a radially outwardly extending extension with a radially outwardly facing groove centered on the projection relative to the respective backing plate, and a pad spring located between the caliper and the extensions of said backing plates, the pad spring comprising a generally H-shaped unitary leaf spring having a longitudinal central body portion spanning said extensions of the first and second backing plates, the central body portion having a downwardly bent portion forming a longitudinal rib, and a pair of oppositely outwardly extending arms at each end of said central body portion, each arm comprising a resilient finger having multiple change-of-direction bends such that the finger terminates in an upwardly, radially outwardly extending finger end, the caliper having a central opening defined by outer sloped side walls extending to an interior area of said caliper comprising sloped top inner walls extending to radially inwardly extending side walls, the spring located within said central opening such that the fingers engage the outer sloped walls and finger ends engage the sloped top inner walls and the longitudinal rib engages each of said grooves of the extensions of the friction pad backing plates, whereby the pad spring biases the friction pad backing plates against said torque receiving portions of the support plate such that the spring may move freely with any movement between the caliper and friction pad backing plates.

One way of carrying out the invention is described in detail below with reference to the drawings which illustrate an embodiment in which.

Figure 1:
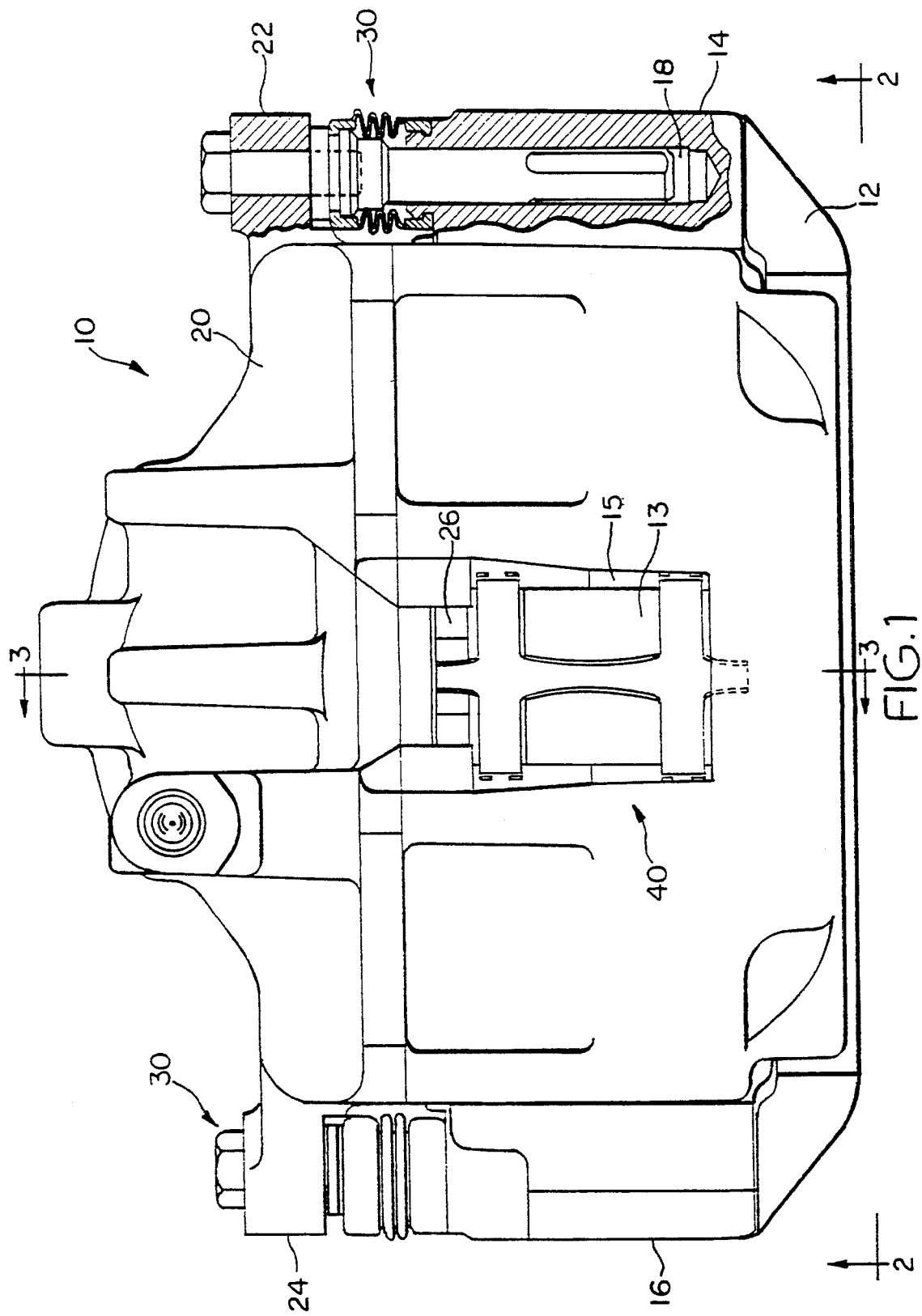
FIG. 1 is a partial section view of the disc brake and spring of the present invention.
Figure 2:
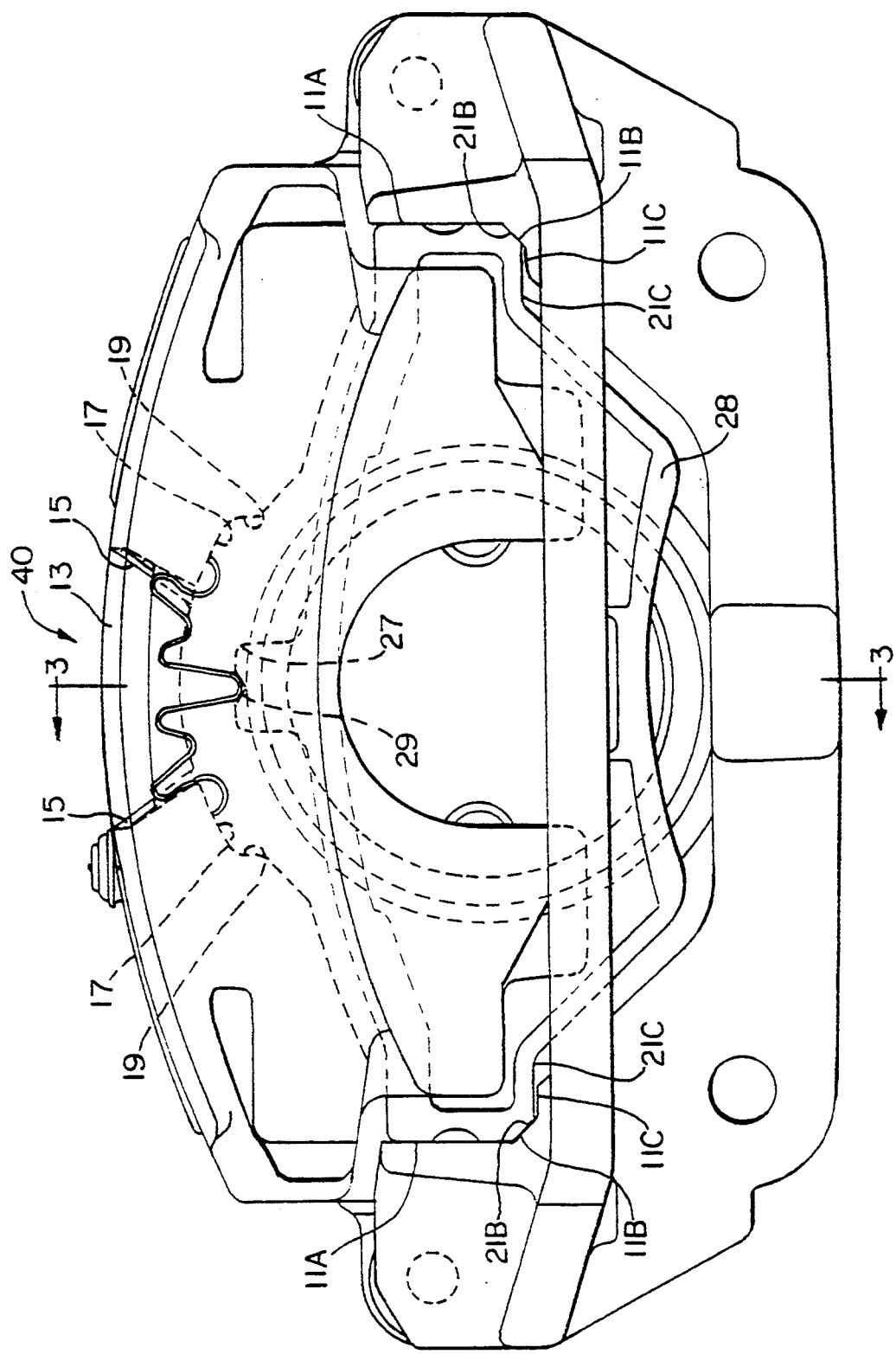
FIG. 2 is a view taken along view line 2—2 of FIG. 1 and showing the spring in solid line outline.
Figure 3:
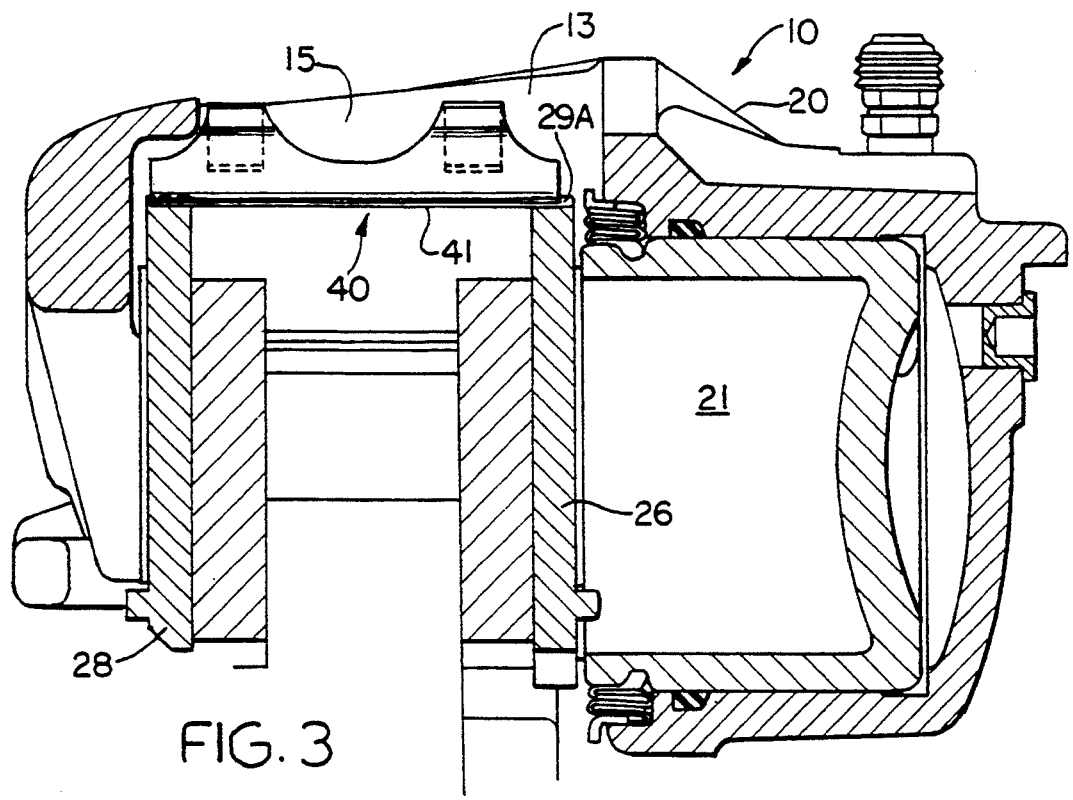
FIG. 3 is a view taken along view line 3—3 of FIG. 1.
Figure 4:
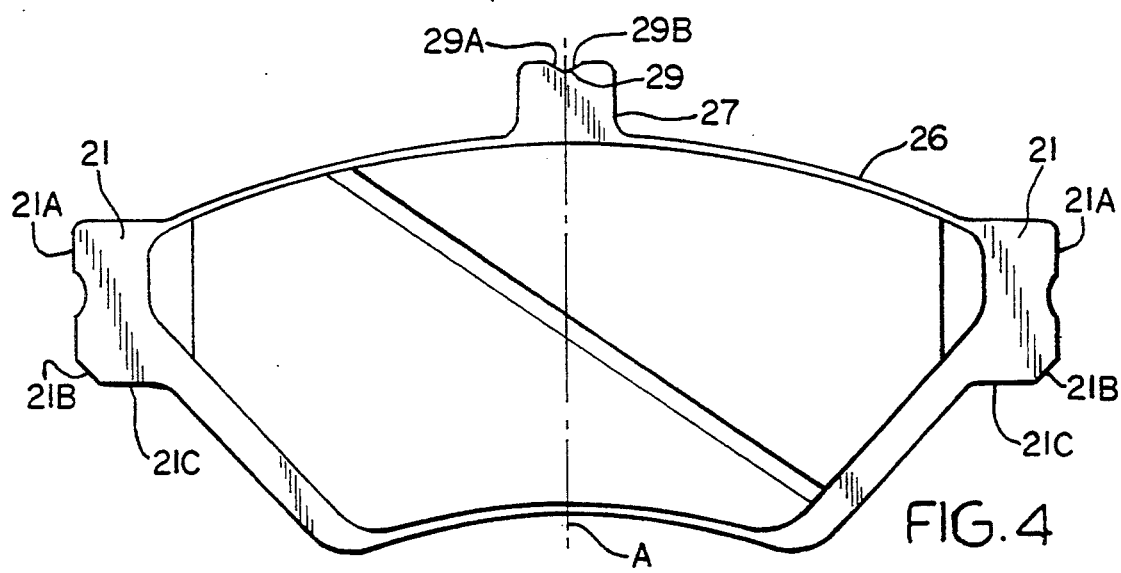
FIG. 4 is a plan view of a friction pad utilized the disc brake of FIG. 1.

The disc brake of the present invention is designated generally by reference numeral 10 in FIG. 1. Disc brake 10 includes support member 12 having radially outwardly extending arms 14, 16 each having a bore such as bore 18 in arm 14. Caliper 20 includes circumferentially spaced apart ear portions 22, 24 receiving bolt means designated generally by reference numeral 30 which extend into the bores (such as bore 18) to mount slidably caliper 20 relative to support member 12. Caliper 20 includes top central opening 13 which enables easy visual inspection of a pad spring that engages friction pad backing plates 26 and 28 (see FIG. 2). As illustrated in FIG. 3, caliper 20 includes hydraulically operated piston 21 which engages the friction pad backing plate 26. FIG. 2 illustrates top central opening 13 which includes a pair of oppositely disposed sloped side walls 15 extending inwardly to sloped top inner walls 17 which extend to radially inwardly extending sidewalls 19. Friction pad backing plates 26 and 28 each have a radially outwardly extending extension 27 (see FIG. 4) having a radially outwardly oriented groove 29 comprising two sloped, flat surfaced side walls 29A and 29B intersecting at a point on the centerline a of the friction pad backing plate. Friction pad backing plates 26, 28 include circumferentially spaced apart lateral projections 21 each having a vertical end surface 21A intersecting with a horizontal lower surface 21C via a chamfered corner surface 21B. Torque member 12 includes vertical surfaces 11A extending to horizontal surfaces 11C via chamfered corner surfaces or torque receiving portions 11B (see FIG. 2). Torque receiving portions 11B are engaged by chamfered corner surfaces 21B of backing plates 26 and 28. Horizontal surfaces 11C are not engaged by the corresponding horizontal lower surfaces 21C of plates 26 and 28; engagement of the backing plates with the support member is at the chamfered surfaces 11B and vertical surfaces and 11A.

Figure 5:
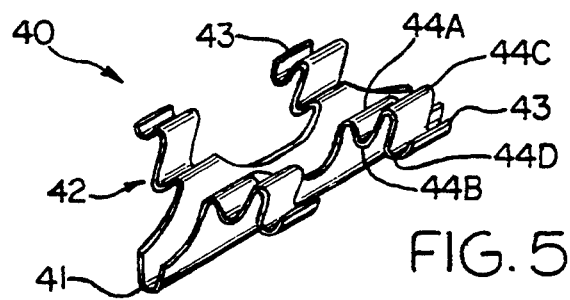
FIG. 5 is an isometric view of the leaf spring utilized in the disc brake illustrated herein.

FIG. 5 illustrates the pad spring designated generally by reference numeral 40 which includes a central body portion comprising a downwardly bent, depending longitudinal rib 41 extending to outwardly extending arms designated generally by reference numerals 42. Each arm 42 includes multiple change-of-direction bends which terminate in finger terminal ends 43 that extend upwardly and radially outwardly for engagement with top inner surfaces 17 of caliper 20 (see FIG. 2). Each finger 42 includes first change-of-direction bend 44A which changes the direction of the finger so that it extends inwardly toward longitudinal rib 41, second change-of-direction bend 44B which changes the direction of the finger so that it extends outwardly and away from longitudinal rib 41, third change-of-direction bend 44C such that the finger extends inwardly, and fourth change-of-direction bend 44D so that the finger changes direction and extends radially outwardly to terminal end 43. Each change-of-direction bend is critical to the form and resiliency of the spring so that the spring will have and retain the desired structural strength and biasing forces. Each finger in the area adjacent third change-of-direction bend 44C engages respective sloped side wall 15 of top central opening 13 as shown in FIG. 2. Because pad spring 40 engages sloped side walls 15 and top inner surface 17 via the areas adjacent third bends 44C and finger terminal ends 43, pad spring 40 is self-attaching relative to opening 13 of caliper 20. In other words, spring 40 is mounted within opening 13 such that its resiliency causes it to self-attach to caliper 20 during assembly or disassembly so that spring 40 remains with the caliper and does not fall away.

The assembled disc brake, as illustrated in FIGS. 1–3, includes the unitary leaf spring, which is generally H-shaped, disposed within top central opening 13 of caliper 20 such that finger terminal ends 43 each engage respectively inner top walls 17, and portions of fingers 42 adjacent each of third bends 44C engage sloped side walls 15 of caliper top opening 13. Longitudinal rib 41 engages the straight sloped side walls 29A and 29B of groove 29 such that the friction pad backing plates are biased radially inwardly relative to the disc brake, and chamfered corner surfaces 21B of each plate engage the respective chamfered corner surfaces 11B of support member 12. Should movement occur between caliper 20 and friction pad backing plates 26 and 28, pad spring 40 permits such movement and moves therewith so that its biasing effect upon friction pad backing plates 26 and 28 is maintained despite the movement. The engagement of vertical surfaces 21A and chamfered corner surfaces 21B of friction pad backing plates 26 and 28 with respective vertical surfaces 11A and chamfered corner surfaces/torque receiving portions 11B of support member 12 provides a quiet operating disc brake that does not suffer from rattling or knocking types of noises as discussed above.

I claim:

1. A disc brake, comprising a support member having torque receiving portions for engagement by first and second friction pad backing plates, a caliper mounted for axially slidable movement relative to the support member via pin means extending between the caliper and the support member, the first and second friction pad backing plates each having circumferentially spaced apart lateral projections shaped complementary to and engaging the torque receiving portions of said support member, each backing plate having a radially outwardly extending extension with a radially outwardly facing groove centered on the extension relative to the respective backing plate, and a pad spring located between the caliper and the extensions of said backing plates, the pad spring comprising a generally H-shaped unitary leaf spring having a longitudinal central body portion spanning said extensions of the first and second backing plates, the central body portion having a downwardly bent portion forming a longitudinal rib, and a pair of oppositely outwardly extending arms at each end of said central body portion, each arm comprising a resilient finger having multiple change-of-direction bends such that the finger terminates in an upwardly, radially outwardly extending finger end, the caliper having a central opening defined by outer sloped side walls extending to an interior area of said caliper comprising sloped top inner walls extending to radially inwardly extending side walls, the spring located within said central opening such that the fingers engage the outer sloped walls and finger ends engage the sloped top inner walls and the longitudinal rib engages each of said grooves of the extensions of the friction pad backing plates, whereby the pad spring biases the friction pad backing plates against said torque receiving portions of the support plate such that the spring may move freely with any movement between the caliper and friction pad backing plates.

2. The disc brake in accordance with claim 1, wherein the torque receiving portions comprise chamfered surfaces located between horizontal and vertical surfaces of the support member.

3. The disc brake in accordance with claim 2, wherein the lateral projections of the friction pad backing plates are chamfered and engage the torque receiving portions of the support member such that the lateral projections of the friction pad backing plates do not engage the horizontal surfaces of the support member.

4. The disc brake in accordance with claim 1, wherein the multiple change-of-direction bends of each finger comprise four curved bends which terminate in the finger end that engages the sloped top inner wall within the caliper.

5. The disc brake in accordance with claim 4, wherein each groove of the respective extension comprises a pair of straight, sloped surfaces intersecting at a point located at a centerline of the friction pad backing plate.

* * * * *